(12) United States Patent
Gafni et al.

(10) Patent No.: US 10,999,366 B2
(45) Date of Patent: May 4, 2021

(54) MIRRORING DROPPED PACKETS

(71) Applicant: MELLANOX TECHNOLOGIES TLV LTD., Raanana (IL)

(72) Inventors: Barak Gafni, Campbell, CA (US); Aviv Kfir, Nili (IL)

(73) Assignee: MELLANOX TECHNOLOGIES TLV LTD., Raanana (IL)

(*) Notice: Subject to any disclaimer, the term of this patent is extended or adjusted under 35 U.S.C. 154(b) by 118 days.

(21) Appl. No.: 16/297,666

(22) Filed: Mar. 10, 2019

(65) Prior Publication Data

US 2020/0287967 A1    Sep. 10, 2020

(51) Int. Cl.
*H04L 29/08* (2006.01)
*H04L 12/46* (2006.01)
*H04L 12/835* (2013.01)
*H04L 12/823* (2013.01)
*H04L 12/947* (2013.01)
*H04L 29/06* (2006.01)

(52) U.S. Cl.
CPC ...... *H04L 67/1095* (2013.01); *H04L 12/4633* (2013.01); *H04L 47/30* (2013.01); *H04L 47/32* (2013.01); *H04L 49/25* (2013.01); *H04L 69/22* (2013.01)

(58) Field of Classification Search
CPC . H04L 67/1095; H04L 49/25; H04L 12/4633; H04L 47/32; H04L 47/30; H04L 69/22
See application file for complete search history.

(56) References Cited

U.S. PATENT DOCUMENTS

| 5,347,637 A | 9/1994 | Halford |
| 6,041,058 A | 3/2000 | Flanders et al. |
| 8,095,683 B2 | 1/2012 | Balasubramaniam Chandra |
| (Continued) |

FOREIGN PATENT DOCUMENTS

CN    1529256 A    9/2004

OTHER PUBLICATIONS

Levy et al., U.S. Appl. No. 16/255,863, filed Jan. 24, 2019.
U.S. Appl. No. 16/416,290 office action dated Dec. 9, 2020.
EP Application # 20 16 1909 Search Report dated Jul 9, 2020.

*Primary Examiner* — Shean Tokuta
*Assistant Examiner* — Juan C Turriate Gastulo
(74) *Attorney, Agent, or Firm* — Kligler & Associates Patent Attorneys Ltd

(57) ABSTRACT

In one embodiment, a network device, includes ports to serve as ingress ports and egress ports, a memory to store received network packets, a switch fabric, a controller to monitor queues of the egress ports and make a decision to drop at least a network packet of the received network packets, the network packet having a first destination address associated with a first network node, and mirroring circuitry to encapsulate the network packet with an encapsulation header including a second destination address different from the first destination address, and feedback the encapsulated network packet into a processing pipeline of the received network packets within the network device at a point in the processing pipeline that is prior to egress port assignment, wherein the switch fabric is configured to forward the encapsulated network packet to the packet analyzer responsively to the second destination address in the encapsulation header.

16 Claims, 7 Drawing Sheets

(56) References Cited

U.S. PATENT DOCUMENTS

| | | | |
|---|---|---|---|
| 8,208,380 B1 | 6/2012 | Nachum et al. | |
| 10,033,607 B2 | 7/2018 | Badea et al. | |
| 10,230,810 B1* | 3/2019 | Bhide | H04L 67/2804 |
| 10,277,518 B1* | 4/2019 | Matthews | H04L 47/50 |
| 2001/0055274 A1 | 12/2001 | Hegge et al. | |
| 2004/0003094 A1* | 1/2004 | See | H04L 43/026 |
| | | | 709/227 |
| 2007/0223385 A1 | 9/2007 | Berly et al. | |
| 2008/0279102 A1 | 11/2008 | Sankaran et al. | |
| 2013/0258858 A1 | 10/2013 | Cherian et al. | |
| 2014/0078915 A1* | 3/2014 | Edsall | H04L 47/30 |
| | | | 370/252 |
| 2015/0254104 A1 | 9/2015 | Kessler et al. | |
| 2016/0087916 A1* | 3/2016 | Janardhanan | H04L 63/1408 |
| | | | 370/390 |
| 2017/0104642 A1 | 4/2017 | Miura et al. | |
| 2017/0279817 A1 | 9/2017 | Campbell et al. | |
| 2017/0337010 A1 | 11/2017 | Kriss et al. | |
| 2017/0339074 A1* | 11/2017 | Melman | H04L 47/32 |
| 2018/0123933 A1 | 5/2018 | Yamashima et al. | |
| 2018/0183733 A1 | 6/2018 | Dcruz et al. | |

* cited by examiner

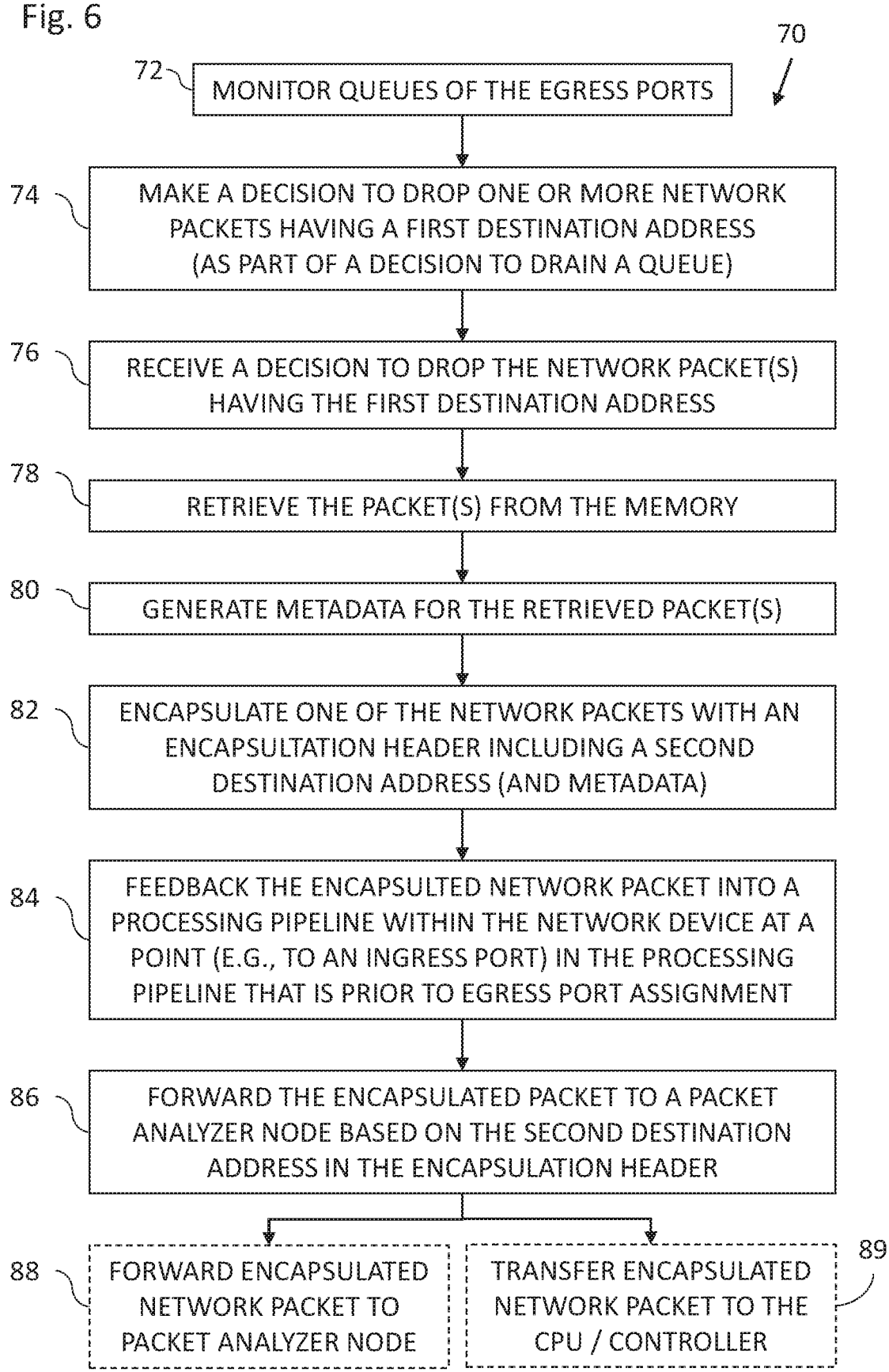

MIRRORING DROPPED PACKETS

FIELD OF THE INVENTION

The present invention relates to mirroring packets, and in particular, to mirroring packets dropped in a network device.

BACKGROUND

As part of network device design, packets may be dropped for various reasons, including cases where after the packets have gone through most of the processing and decision making, including sometimes scheduling, a decision to drop the packets may occur.

In one scenario, packets may be dropped if they are waiting too much time on a head of a queue. For example, in lossless networks, flow control may lead to a queue being held from sending packets, and in some cases, this may cause a lock in the network. In order to solve the aforementioned problems, the queue may be drained.

In another scenario, packets may be spending too much time in a network device. For example, usually because of congestion, packets may reside in the network device too long, which makes it potentially irrelevant. Hence, a network device is expected to drop such packets.

In some situations, Spanning Tree and/or VLAN filtering logic that applies per egress port in a network device might prevent a packet from being forwarded. In other situations, an error occurring in the network device may lead to a packet becoming illegal, evidenced by an invalid cyclic redundancy check (CRC), leading to the illegal packet being dropped.

A "bad" CRC emanating from outside the current network device may lead to a packet being dropped. For example, in cut-through scenarios, there might be cases where the packet starts to get transmitted by a network device even though the network device does not know the CRC yet, hence the packet may arrive in an invalid state after some of the packet is already transmitted.

A maximum transmission unit (MTU) violation may lead to a packet being dropped, for example, if the packet is larger than the size allowed on the link.

Dropped packets may be mirrored to a packet analyzer in order to learn why a packet has been dropped. For example, U.S. Pat. No. 8,095,683 to Balasubramaniam Chandra describes a system for mirroring dropped packets by extending port mirroring. Networking devices, such as firewalls and routers drop some packets during data transmission due to various security issues, congestion and errors in the packets. The dropped packets are mirrored at a user-specified destination port by extending port mirroring. The mirrored packets can then be further analyzed by external traffic analyzers. The analysis can be helpful in finding out any mismatch between firewall rules and security policies at firewalls. Moreover, the analysis can also be helpful in finding out the extent of loss of useful data in dropped packets at forwarding devices such as routers, bridges, switches, firewalls etc.

US Patent Publication 2001/0055274 of Hegge, et al., describes a network switch having a plurality of mirror ports to which data is copied for purposes such as networking monitoring. Data flows are identified and copied to an appropriate mirror port in response to the type of flow, a mirroring policy set up by a network administrator, and a distribution mechanism. A monitoring device attached to each mirror port is able to monitor specific types of traffic. The mirror ports are collected into groups of such ports. A given port may only be a member of a single group at one time. The mirroring policy must identify the group to which a particular type of flow is copied.

SUMMARY

There is provided in accordance with an embodiment of the present disclosure, a network device, including a plurality of ports configured to serve as ingress ports for receiving network packets from a network and as egress ports for forwarding at least some of the network packets, a switch fabric configured to selectively connect the ingress ports with the egress ports at least destination addresses of the received network packets, a controller configured to monitor queues of the egress ports and make a decision to drop at least a network packet of the received network packets, the network packet having a first destination address associated with a first network node, and mirroring circuitry configured to encapsulate the network packet yielding an encapsulated network packet with an encapsulation header which includes a second destination address different from the first destination address, and feedback the encapsulated network packet into a processing pipeline of the received network packets within the network device at a point in the processing pipeline that is prior to egress port assignment, wherein the switch fabric is configured to forward the encapsulated network packet to a packet analyzer based on at least the second destination address in the encapsulation header.

Further in accordance with an embodiment of the present disclosure the mirroring circuitry is configured to encapsulate the network packet after the network packet has been assigned to one of the egress ports assigned for forwarding traffic to the first network node.

Still further in accordance with an embodiment of the present disclosure, the device includes a memory, wherein the mirroring circuitry is configured to encapsulate the network packet after at least some data of the network packet has been read from the memory to one of the egress ports assigned for forwarding traffic to the first network node.

Additionally, in accordance with an embodiment of the present disclosure the controller is configured to make a decision to drain one of the queues including multiple ones of the network packets resulting in dropping the multiple network packets including the network packet.

Moreover, in accordance with an embodiment of the present disclosure the packet analyzer is disposed externally to the network device, the switch fabric being configured to assign the encapsulated network packet to one of the egress ports, the assigned egress port being configured to forward the encapsulated network packet to the packet analyzer via the network.

Further in accordance with an embodiment of the present disclosure the packet analyzer is disposed externally to the network device, the switch fabric being configured to assign the encapsulated network packet to one of the egress ports, the assigned egress port being configured to forward the encapsulated network packet to the packet analyzer, which is directly connected to the network device.

Still further in accordance with an embodiment of the present disclosure, the device includes a processing unit, wherein the packet analyzer is included in the processing unit, the switch fabric being configured to transfer the encapsulated network packet to the packet analyzer in the processing unit responsively to reading at least the second destination address in the encapsulation header.

Additionally, in accordance with an embodiment of the present disclosure, the device includes a processing unit, wherein the processing unit runs an agent connected to the packet analyzer, the switch fabric being configured to transfer the encapsulated network packet to the agent in the processing unit responsively to reading at least the second destination address in the encapsulation header.

Moreover, in accordance with an embodiment of the present disclosure the mirroring circuitry is configured to include metadata in the encapsulation header of the encapsulated network packet.

Further in accordance with an embodiment of the present disclosure the metadata includes one or more of the following an ingress port identification, an ingress priority, an ingress timestamp, an egress timestamp, a pad count of padding of the network packet, a packet switch network identification, an identification of an egress port of the first destination address, whether the network packet is a unicast or multicast packet, an egress queue, an ingress buffer fill level, an egress buffer fill level, flags, a mirror reason, and a mirror agent identification.

There is also provided in accordance with another embodiment of the present disclosure, a mirroring method, including receiving network packets in a network device from a network, forwarding at least some of the network packets, storing the received network packets, selectively connecting ingress ports with egress ports at least destination addresses of the received network packets, monitoring queues of the egress ports, making a decision to drop at least a network packet of the received network packets, the network packet having a first destination address associated with a first network node, encapsulating the network packet yielding an encapsulated network packet with an encapsulation header which includes a second destination address different from the first destination address, feedbacking the encapsulated network packet into a processing pipeline of the received network packets within the network device at a point in the processing pipeline that is prior to egress port assignment, and forwarding the encapsulated network packet to a packet analyzer based on at least the second destination address in the encapsulation header.

Still further in accordance with an embodiment of the present disclosure the encapsulating is performed after the network packet has been assigned to one of the egress ports assigned for forwarding traffic to the first network node.

Additionally, in accordance with an embodiment of the present disclosure the encapsulating is performed after at least some data of the network packet has been read from a memory to one of the egress ports assigned for forwarding traffic to the first network node.

Moreover, in accordance with an embodiment of the present disclosure, the method includes making a decision to drain one of the queues including multiple ones of the network packets resulting in dropping the multiple network packets including the network packet.

Further in accordance with an embodiment of the present disclosure the packet analyzer is disposed externally to the network device, the method further including assigning the encapsulated network packet to one of the egress ports, and forwarding the encapsulated network packet to the packet analyzer via the network.

Still further in accordance with an embodiment of the present disclosure the packet analyzer is disposed externally to the network device, the method further including assigning the encapsulated network packet to one of the egress ports, and forwarding the encapsulated network packet to the packet analyzer, which is directly connected to the network device.

Additionally, in accordance with an embodiment of the present disclosure the packet analyzer is included in a processing unit of the network device, further including transferring the encapsulated network packet to the packet analyzer in the processing unit responsively to reading at least the second destination address in the encapsulation header.

Moreover, in accordance with an embodiment of the present disclosure a processing unit of the network device runs an agent connected to the packet analyzer, further including transferring the encapsulated network packet to the agent in the processing unit responsively to reading at least the second destination address in the encapsulation header.

Further in accordance with an embodiment of the present disclosure, the method includes including metadata in the encapsulation header of the encapsulated network packet.

Still further in accordance with an embodiment of the present disclosure the metadata includes one or more of the following an ingress port identification, an ingress priority, an ingress timestamp, an egress timestamp, a pad count of padding of the network packet, a packet switch network identification, an identification of an egress port of the first destination address, whether the network packet is a unicast or multicast packet, an egress queue, an ingress buffer fill level, an egress buffer fill level, flags, a mirror reason, and a mirror agent identification.

BRIEF DESCRIPTION OF THE DRAWINGS

The present invention will be understood from the following detailed description, taken in conjunction with the drawings in which:

FIG. 6 is a flow chart including exemplary steps in a packet mirroring method in the network device of FIG. 1.

DESCRIPTION OF EXAMPLE EMBODIMENTS

Overview

Figure 1:
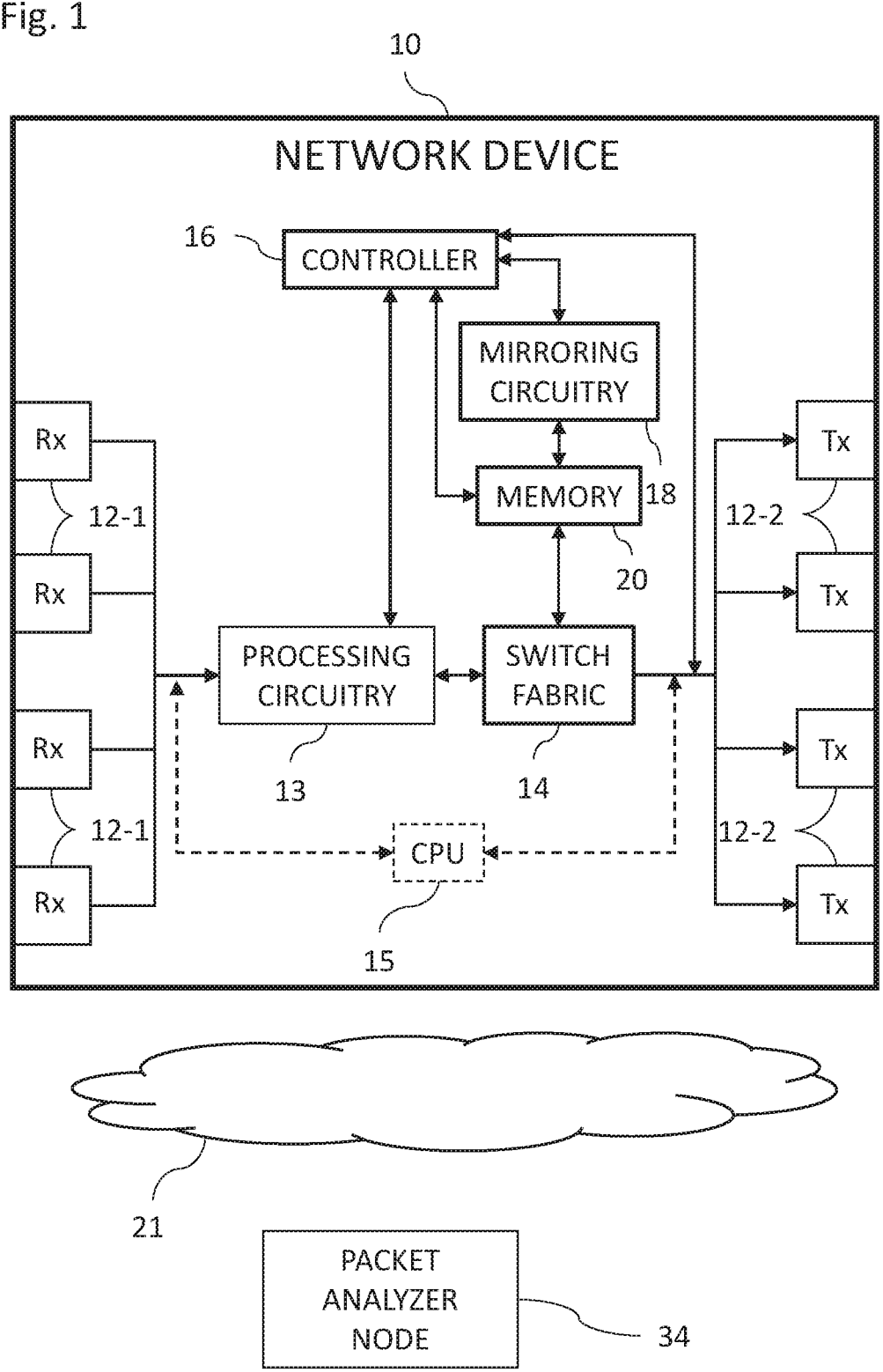
FIG. 1 is a block diagram view of a network device constructed and operative in accordance with an embodiment of the present invention.

As mentioned above, as part of network device design, packets may be dropped for various reasons, including cases where after the packets have gone through most of the processing and decision making, including sometimes scheduling, a decision to drop the packets may occur.

Mirroring packets after the packets have gone through most of the processing pipeline in the network device presents a challenge as the packets may have already been assigned to an egress port and in some cases packet data may have already been read from memory in order to transmit the packet. Simply changing the forwarding decision in order to mirror late in the processing pipeline may be practically impossible. Therefore, the reasons behind why packets are dropped in the late stages of the processing pipeline are relatively hard to understand from the operator perspective.

In embodiments of the present invention, dropped packets may be mirrored to a packet analyzer even late in a processing pipeline of a network device. e.g., after the packets have already been assigned to an egress port or where some of the packet data has already been read from memory in order to transmit the packet. The mirroring may allow network operators to understand why packets have been dropped, even late in the processing pipeline, and potentially help remove the root cause that resulted in the packets being dropped.

Mirroring may be performed by the network device encapsulating each to-be-dropped packet with an encapsulation header, which includes a destination address of a packet analyzer node. The destination address included in the header may be a destination MAC address, or a destination IP address, by way of example only. The encapsulation may be performed by mirroring circuitry generally disposed in the region of the egress ports or in any other suitable location in the network device.

The network device feeds back each encapsulated packet to an earlier stage in the processing pipeline of the network device, for example, to a stage prior to assignment of an egress port. The normal pipeline processing of the network device then forwards the encapsulated packet to the packet analyzer node responsively to at least the destination address included in the encapsulation header. In particular, the encapsulation results in switch fabric of the network device forwarding according to a destination address of the packet analyzer node in the encapsulation header instead of a destination address of the original recipient of the packet including changing to a new egress port.

Using the above technique, it is possible to mirror packets to anywhere in the network, and not necessarily to a locally-connected analyzer, and not necessarily to a port dedicated to the packet analyzer node.

In some embodiments, the network device adds relevant metadata to the encapsulated packet for assisting the packet analyzer node.

In some embodiments, the controller or a processing unit of the network device runs a packet analyzer or an agent connected to the packet analyzer. In these embodiments, the mirroring circuitry encapsulates the packet with an encapsulation header having a destination address, which is interpreted by the switch fabric as being associated with the controller or the processing unit. The switch fabric then forwards the packet to the controller or the processing unit within the network device.

System Description

Reference is now made to FIG. 1, which is a block diagram view of a network device 10 constructed and operative in accordance with an embodiment of the present invention. The network device 10 may be any suitable network device for forwarding packets, for example, but not limited to, a layer 1 or a layer 2 switch, or a router. The network device 10 includes a plurality of ports 12, processing circuitry 13, switch fabric 14, a controller 16, mirroring circuitry 18, and a memory 20. The network device 10 may include a processing unit such as a central processing unit (CPU) 15 described in more detail with reference to FIG. 4.

For the sake of simplicity other standard elements which may be included in the network device 10 have not been shown.

The ports 12 may be configured to serve as ingress ports 12-1 for receiving network packets from a network 21 and egress ports 12-2 for forwarding at least some of the received network packets (as some of the received network packets may be dropped in the network device 10). Each port 12 therefore has an ingress port part (Rx) 12-1 and an egress port part (Tx) 12-2. In the exemplary embodiment of FIG. 1, for the sake of simplicity, the ingress port parts 12-1 are shown on the left of FIG. 1 and the egress port parts 12-2 shown on the right of FIG. 1.

Each ingress port 12-1 may perform one or more of the following functions: receive network packets, terminate a physical link from an external device.

The processing circuitry 13 may perform at least one or more of the following functions: data-link-layer functions, forwarding table lookup, forward network packets to the switch fabric 14.

The switch fabric 14 is configured to selectively connect the ingress ports 12-1 with the egress ports 12-2 according to at least the destination addresses of the received network packets and perform queuing functions. The switch fabric 14 is described in more detail with reference to FIGS. 2-6 below.

The controller 16 is configured to perform one or more of the following functions: execute routing protocols, maintain forwarding tables, and monitor queues of the egress ports and make a decision to drop one or more network packets of the received network packets responsively to the queue monitoring. The controller 16 is described in more detail with reference to FIGS. 2-6 below.

Each egress port may perform one or more of the following functions: store incoming network packets in queues, transmit network packets on an outgoing link, and perform data link and physical (Phy) layer functionality.

The mirroring circuitry 18 is configured to mirror to-be-dropped network packets to a packet analyzer node 34. The packet analyzer node 34 is shown in FIG. 1 as being disposed in the network 21. The packet analyzer node 34 may be disposed in any suitable location for example, but not limited to, directly connected to the network device 10 (such as to one of the ports 12) and or run as a software program in the controller 16. The mirroring circuitry 18 and the packet analyzer 34 are described in more detail with reference to FIGS. 2-6 below.

The memory 20 is configured to store the received network packets at various stages of processing in the network device 10 for example, but not limited to, while the network packets are in various queues and other buffered stages. The memory 20 may be implemented as a unitary item or as more than one memory of the same or different types of volatile memory.

The functionality of the ports 12, processing circuitry 13, switch fabric 14, controller 16 and the mirroring circuitry 18 may be implemented using a single physical component or, alternatively, implemented using multiple physical components. These physical components may comprise hard-wired or programmable devices, or a combination of the two. In some embodiments, at least some of the functions described above may be carried out by a programmable processor under the control of suitable software. This software may be downloaded to the network device 10 in electronic form, over a network, for example. Alternatively, or additionally, the software may be stored in tangible, non-transitory computer-readable storage media, such as optical, magnetic, or electronic memory.

Figure 2:
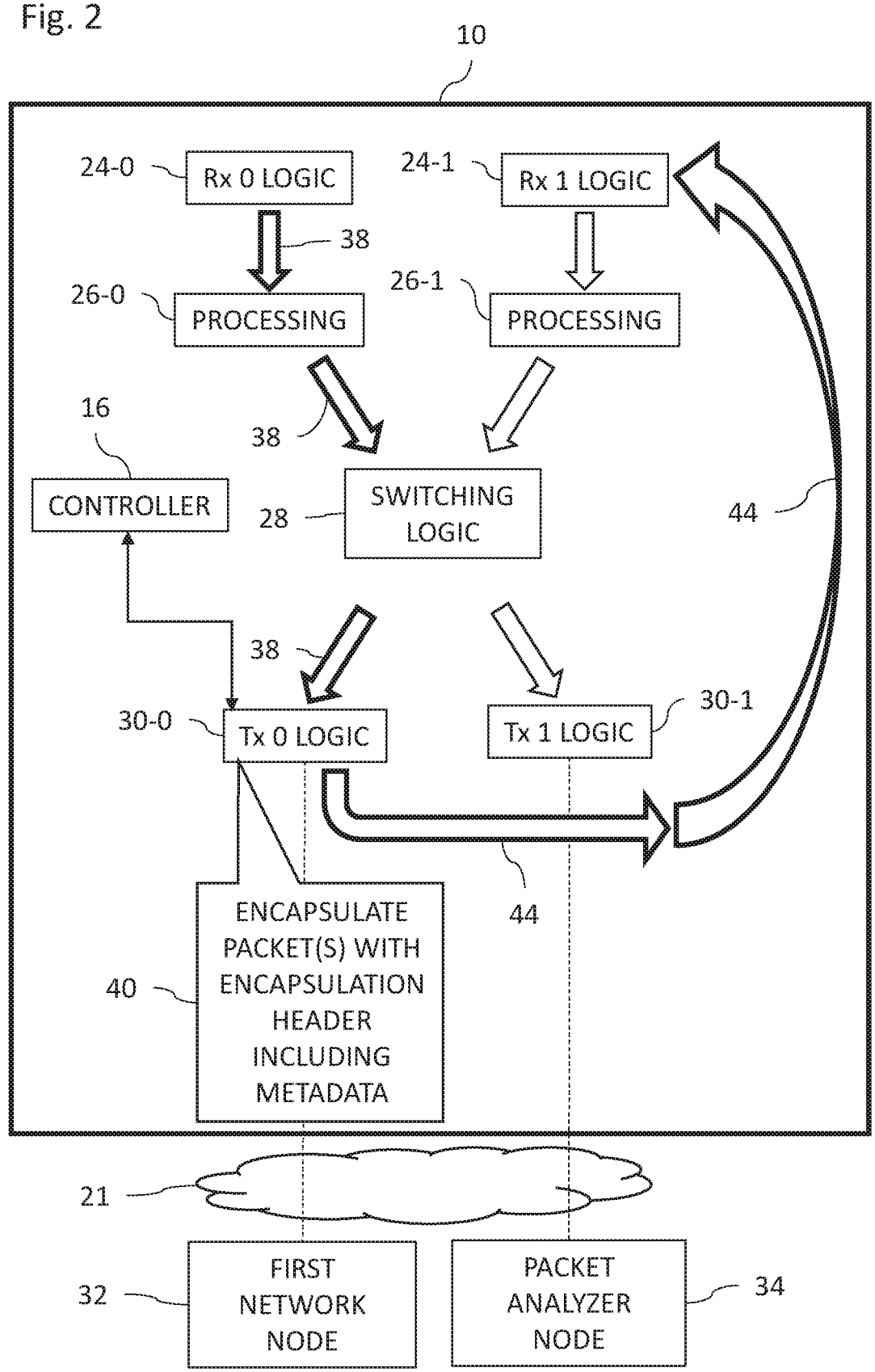
FIG. 2 is a block diagram view of a first part of a processing logic in the network device of FIG. 1.

Reference is now made to FIG. 2, which is a block diagram view of a first part of a processing logic in the network device 10 of FIG. 1. FIG. 2 shows that packets (not shown) received by Rx 0 Logic 24-0 are processed in a processing pipeline 26. A part of the processing pipeline 26 serving packets received by Rx 0 Logic 24-0 has been labeled 26-0 and a part of a part of the processing pipeline 26 serving packets received by Rx 1 Logic 24-1 has been labeled 26-1. The Rx 0 Logic 24-0 generally performs ingress port 12-1 functionality described above with reference to FIG. 1. The processing pipeline 26 generally performs the functionality of the processing circuitry 13 described above with reference to FIG. 1 including retrieving the destination address and mapping it to an egress port. A switching logic 28 generally performs the functionality of the switch fabric 14 described with reference to FIG. 1 selectively connecting the ingress ports 12-1 with the egress ports 12-2 according to at least the destination address of each of the received network packets, and forwards the network packets to Tx 0 Logic 30-0. Tx 0 Logic 30-0 generally performs egress port functionality, described above with reference to FIG. 1, to forward the network packets to a first network node 32 according to at least a destination address in each of the network packets. The processing path of the network packets from the Rx 0 Logic 24-0 to the Tx 0 Logic 30-0 is shown by arrows 38.

In the example of FIG. 2, the controller 16, which is monitoring the queue of the Tx 0 Logic 30-0, determines that one or more of the network packets in the queue should be dropped or that the whole queue should be drained. Prior to draining the queue, the controller 16 instructs the mirroring circuitry 18 (FIG. 1) to perform mirroring of the to-be-dropped network packets to a packet analyzer node 34 which is connected to Tx 1 Logic 30-1 via the network 21. The mirroring may comprise mirroring all of the to-be-dropped network packets to the packet analyzer node 34 or only some of the to-be-dropped network packets.

The mirroring circuitry 18 encapsulates one or more of the to-be-dropped network packets with an encapsulation header (block 40) with each of the to-be-dropped network packets being encapsulated in its own encapsulation header. The encapsulation header includes a destination address associated with the packet analyzer node 34 and optionally metadata that may be used by the packet analyzer node 34 to determine what caused the problem which led to dropping the network packet(s). The term "encapsulation" as used in the specification and claims in all its grammatical forms includes adding an addition header (e.g., an encapsulation header) to a packet which includes a header (i.e., the received packet header) and payload so that the encapsulated packet includes the encapsulation header, the received packet header and the packet payload.

The mirroring circuitry 18 feeds the encapsulated network packet(s) back into the processing pipeline 26 to a stage in the processing pipeline 26 which is prior to egress port assignment, for example, back to one of the ingress ports 12-1, such as Rx 1 Logic 24-1 (via arrows 44). Rx 1 Logic 24-1 was selected as the feedback point by way of example. However, the encapsulated packets may be fed back to any suitable ingress port 12-1 or any suitable point in the processing pipeline 26 which is in a stage of the processing pipeline 26 prior to egress port assignment.

Figure 3:
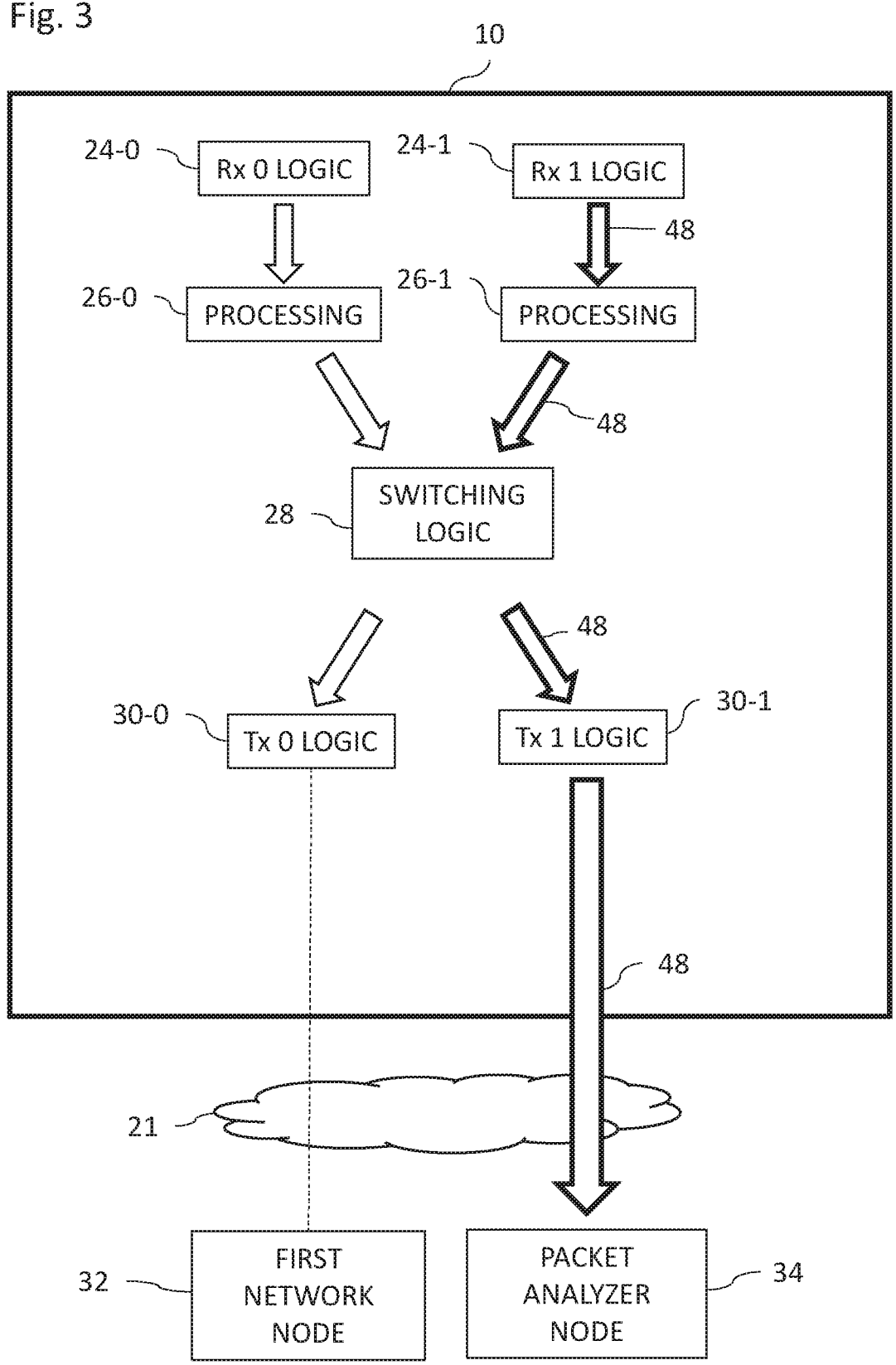
FIG. 3 is a block diagram view of a second part of the processing logic of FIG. 2.

Reference is now made to FIG. 3, which is a block diagram view of a second part of the processing logic of FIG. 2. The encapsulated network packet(s) are received by the Rx 1 Logic 24-1 and then processed by a processing pipeline 26-1. The Rx 1 Logic 24-1 and the processing pipeline 26-1 generally perform ingress port 12-1 functionality and the processing circuitry 13 functionality, respectively, described above with reference to FIG. 1. After processing by the processing pipeline 26-1, the encapsulated network packets are selectively forwarded by the switching logic 28 to the Tx 1 Logic 30-1 which forwards the encapsulated network packet(s) to the packet analyzer node 34 via the network 21. The processing path of the network packets from the Rx 1 Logic 24-1 to the packet analyzer node 34 is shown by arrows 48. In some embodiments the packet analyzer node 34 may be directly connected to the network device 10 so that the encapsulated network packets do not need to travel via the network 21 to reach the packet analyzer node 34.

Figure 4:
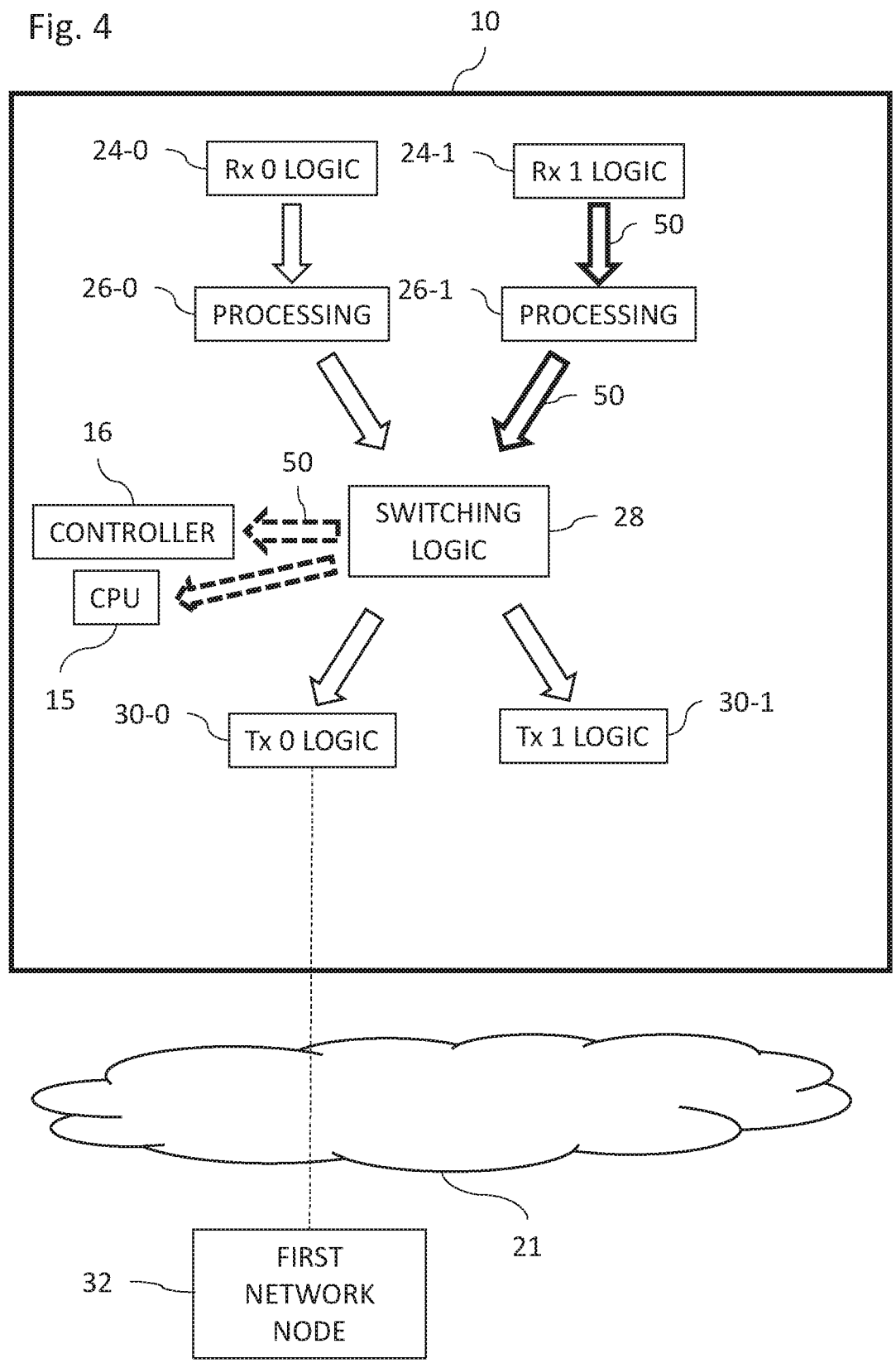
FIG. 4 is a block diagram view of an alternative second part of the processing logic of FIG. 2.

Reference is now made to FIG. 4, which is a block diagram view of an alternative second part of the processing logic of FIG. 2. In some embodiments, the CPU 15 runs a packet analyzer or an agent which is connected to a packet analyzer (either in the network device 10, locally connected to the network device 10, or connected to the network device 10 via the network 21). In these embodiments, the mirroring circuitry 18 (FIG. 1) encapsulates one or more of the to-be-dropped network packet(s) with an encapsulation header having a destination address, which is interpreted by the switch fabric 28 as being associated with the CPU 15. The mirroring circuitry 18 feeds back the encapsulated network packet(s) according to the method described above with reference to FIG. 1.

The functionality mentioned herein regarding the packet analyzer and the agent may be performed by the controller 16 or any other suitable processing unit instead of the CPU 15 in which the agent and/or the packet analyzer runs on the controller 16 or the other processing unit.

If the encapsulated network packet(s) is (are) fed back to Rx 1 Logic 24-1 (by way of example), the encapsulated network packet(s) is (are) received by the Rx 1 Logic 24-1 and then processed by the processing pipeline 26-1. The Rx 1 Logic 24-1 and the processing pipeline 26-1 generally perform ingress port 12-1 functionality and the processing circuitry 13 functionality described above with reference to FIG. 1. After the processing by the processing pipeline 26-1, the encapsulated network packets are selectively forwarded by the switching logic 28 to the controller 16 within the network device 10. The processing path of the network packets from the Rx 1 Logic 24-1 to the controller 16 is shown by arrows 50. In some embodiments, the agent may add another layer of encapsulation, optionally with metadata, prior to forwarding the encapsulated network packets to the packet analyzer.

Figure 5:
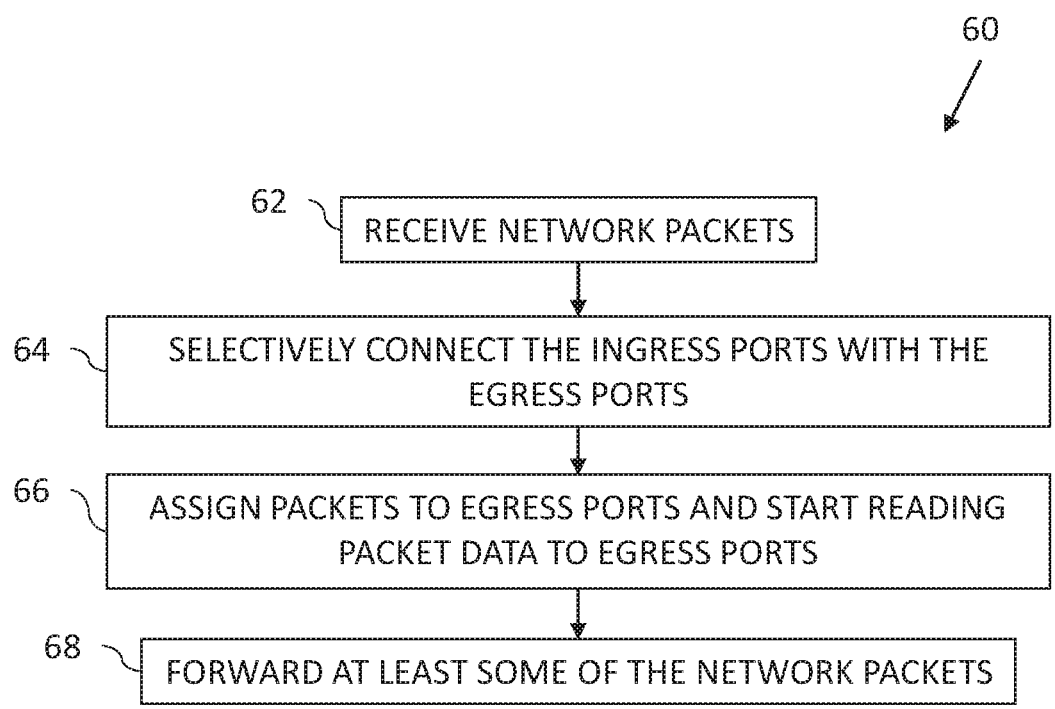
FIG. 5 is a flow chart including exemplary steps in a packet forwarding method in the network device of FIG. 1.

Reference is now made to FIG. 5, which is a flow chart 60 including exemplary steps in a method of operation of the network device 10 of FIG. 1. The ingress ports 12-1 are configured to receive (block 62) network packets. Some of the network packets have a packet header including a destination address of the first network node 32 (FIGS. 2-4). The switch fabric 14 (FIG. 1) is configured to selectively connect (block 64) the ingress ports 12-1 with the egress ports 12-2 according to at least the destination addresses of the received network packets. The switch fabric 14 is configured to assign (block 66) network packets to the egress ports 12-2 according to at least the destination address of each network packet and start reading packet data to the relevant egress ports 12-2. The network packets including the destination address of the first network node 32 are assigned to the egress port 12-2 associated with the first network node 32. The egress ports 12-2 are configured to forward (block 68) at least some of the network packets to relevant network nodes according to at least the destination address of each packet. The above process may also be used for the encapsulated network packets wherein forwarding of the encapsulated packets is performed according to at least the destination address in the encapsulation header and not according to the destination address in the header of the original packet before the encapsulation header was added.

Reference is now made to FIG. 6, which is a flow chart 70 including exemplary steps in a packet mirroring method in the network device 10 of FIG. 1. Reference is also made to FIG. 1.

The controller 16 is configured to monitor (block 72) queues of the egress ports 12-2 and make (block 74) a decision to drop one or more network packets of the received network packets. The controller 16 may be configured make a decision to drain one of the queues comprising multiple network packets resulting in dropping the multiple network packets.

The mirroring circuitry 18 is configured to receive (block 76) a decision to drop the network packet(s) having a first destination address associated with the first network node 32 (FIG. 2). The mirroring circuitry 18 is configured to retrieve (block 78) the network packet(s) having the first destination address from the memory 20. The mirroring circuitry 18 is also generally configured to determine which of the network packet(s) should be mirrored.

The mirroring circuitry 18 is optionally configured to generate (block 80) metadata for adding to the encapsulation header of each of the retrieved network packets. The metadata may include one or more of the following: an ingress port identification of the ingress port used by the retrieved network packet; an ingress port priority of that ingress port; an ingress timestamp of the retrieved network packet; an egress timestamp of the retrieved network packet; a pad count of padding of the retrieved network packet; a packet switch network identification; an egress port identification of the egress port that the retrieved network packet was assigned to; whether the retrieved network packet is a unicast or multicast packet; an egress queue identification of the retrieved network packet; an ingress buffer fill level; an egress buffer fill level; flags; a mirror reason; and a mirror agent identification (e.g., an internal identification of the packet analyzer node 34). The flags may include any one or more of the following: time stamp field is valid, packet was truncated, original packet size is valid, egress port field is valid, packet sequence number field is valid, ingress port field is valid, egress port field is link aggregation (LAG), ingress port field is LAG.

The mirroring circuitry 18 is configured to encapsulate (block 82) the retrieved network packet (or each of the retrieved network packets) yielding an encapsulated network packet (or network packets) with an encapsulation header which includes a second destination address different from the first destination address of the first network node 32 (FIG. 2). The mirroring circuitry 18 is optionally configured to include the generated metadata in the encapsulation header of the encapsulated network packet(s).

In some embodiments, the mirroring circuitry 18 is configured to encapsulate the network packet(s) after the network packet(s) has (have) been assigned to one of the egress ports 12-2 assigned for forwarding traffic to the first network node 32. In some embodiments, the mirroring circuitry 18 is configured to encapsulate the network packet(s) after at least some data of the network packet(s) has been read from the memory 20 to one of the egress ports 12-2 assigned for forwarding traffic to the first network node 32.

The mirroring circuitry 18 is configured to feedback (block 84) the encapsulated network packet into the processing pipeline 26 (FIGS. 2-4) of the received network packets within the network device 10 at a point in the processing pipeline 26 that is prior to egress port 12-2 assignment. In some embodiments, the mirroring circuitry 18 is configured to feedback the encapsulated network packet(s) to one of the ingress ports 12-1 (e.g., the Rx 1 Logic 24-1 of FIG. 2).

The switch fabric 14 is configured to (block 86) forward the encapsulated network packet(s) to the packet analyzer node 34 based on at least the second destination address in the encapsulation header (of each encapsulated packet) and according to the decision made in the processing pipeline 26.

When packet analyzer node 34 is disposed externally to the network device 10, exemplified in FIG. 3, the switch fabric 14 is configured to assign the encapsulated network packet(s) to one of the egress ports 12-2 associated with the second destination address of the packet analyzer node 34. The assigned egress port 12-2 is configured to forward (block 88) the encapsulated network packet(s) to the packet analyzer node 34. In some embodiments, the egress port 12-2 associated with the second destination address of the packet analyzer node 34 is a not dedicated to the packet analyzer node 34. For example, there may be additional network elements connecting the egress port 12-2 with the packet analyzer node 34.

When the packet analyzer is comprised in the CPU 15 (or the controller 16), the switch fabric 14 is configured to transfer (block 89) the encapsulated network packet(s) to the packet analyzer in the CPU 15 (or the controller 16) responsively to reading at least the second destination address in the encapsulation header (of each encapsulated packet).

Figure 7A:
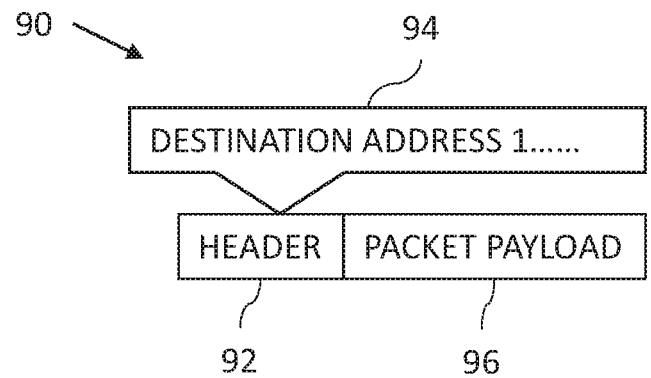
FIGS. 7A-B show a schematic view of a network packet before and after encapsulation in accordance with an embodiment of the present invention.
Figure 7B:
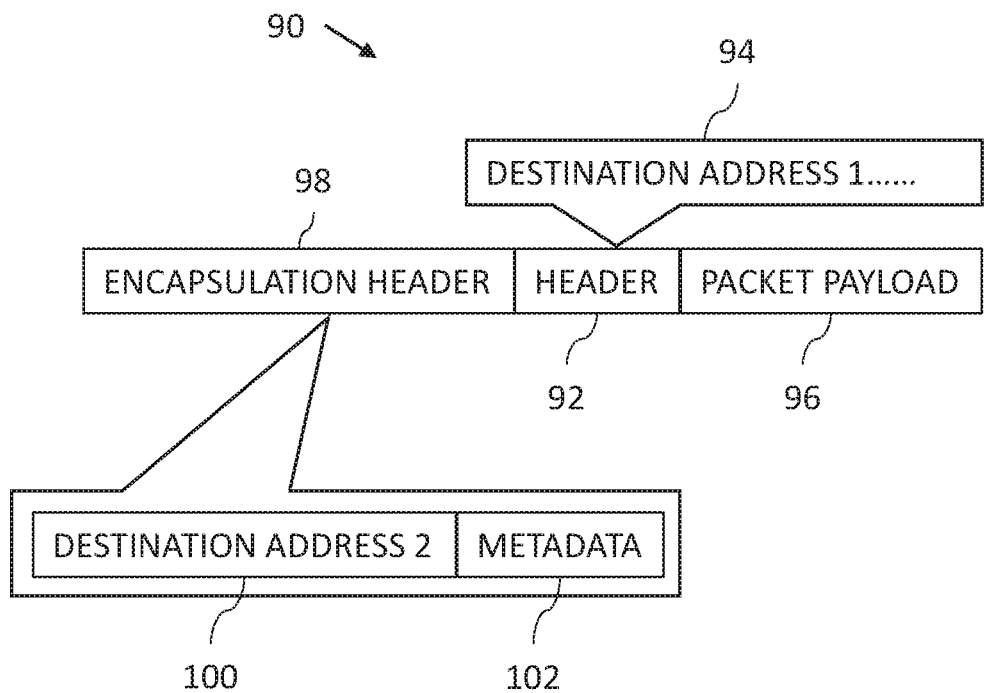

Reference is now made to FIGS. 7A-B, which show a schematic view of a network packet 90 before and after encapsulation in accordance with an embodiment of the present invention. FIG. 7A shows the network packet 90 including a header 92 having a destination address 94 (e.g., destination address 1 of the first network node 32) and a packet payload 96. FIG. 7B shows that the network packet 90 has now been encapsulated with an encapsulation header 98, which includes a destination address 100 (e.g., destination address 2 of the packet analyzer node 34) and metadata 102.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A network device, comprising:
    a plurality of ports configured to serve as ingress ports for receiving network packets from a network and as egress ports for forwarding at least some of the network packets;
    a switch fabric configured to selectively connect the ingress ports with the egress ports according to at least destination addresses of the received network packets;
    a controller configured to monitor queues of the egress ports and make a decision to drop at least a network packet of the received network packets, the network packet having a first destination address associated with a first network node;
    mirroring circuitry configured to:
        encapsulate the network packet yielding an encapsulated network packet with an encapsulation header which includes a second destination address different from the first destination address; and
        feedback the encapsulated network packet into a processing pipeline of the received network packets within the network device at a point in the processing pipeline that is prior to egress port assignment, wherein the switch fabric is configured to forward the encapsulated network packet to a packet analyzer based on at least the second destination address in the encapsulation header; and
    a processing unit,
    wherein the processing unit runs an agent connected to the packet analyzer, the switch fabric being configured to transfer the encapsulated network packet to the agent in the processing unit responsively to reading at least the second destination address in the encapsulation header, and
    wherein the agent is configured to add another layer of encapsulation with metadata, prior to forwarding the encapsulated network packet to the packet analyzer.

2. The device according to claim 1, wherein the mirroring circuitry is configured to encapsulate the network packet after the network packet has been assigned to one of the egress ports assigned for forwarding traffic to the first network node.

3. The device according to claim 1, further comprising a memory, wherein the mirroring circuitry is configured to encapsulate the network packet after at least some data of the network packet has been read from the memory to one of the egress ports assigned for forwarding traffic to the first network node.

4. The device according to claim 1, wherein the controller is configured to make a decision to drain one of the queues comprising multiple ones of the network packets resulting in dropping the multiple network packets including the network packet.

5. The device according to claim 1, wherein the packet analyzer is disposed externally to the network device, the switch fabric being configured to assign the encapsulated network packet to one of the egress ports, the assigned egress port being configured to forward the encapsulated network packet to the packet analyzer via the network.

6. The device according to claim 1, wherein the packet analyzer is disposed externally to the network device, the switch fabric being configured to assign the encapsulated network packet to one of the egress ports, the assigned egress port being configured to forward the encapsulated network packet to the packet analyzer, which is directly connected to the network device.

7. The device according to claim 1, wherein the mirroring circuitry is configured to include metadata in the encapsulation header of the encapsulated network packet.

8. The device according to claim 7, wherein the metadata includes one or more of the following: an ingress port identification; an ingress priority; an ingress timestamp; an egress timestamp; a pad count of padding of the network packet; a packet switch network identification; an identification of an egress port of the first destination address; whether the network packet is a unicast or multicast packet; an egress queue; an ingress buffer fill level; an egress buffer fill level; flags;
    a mirror reason; and a mirror agent identification.

9. A mirroring method, comprising:
    receiving network packets in a network device from a network;
    forwarding at least some of the network packets;
    storing the received network packets;
    selectively connecting ingress ports with egress ports according to at least destination addresses of the received network packets;
    monitoring queues of the egress ports;
    making a decision to drop at least a network packet of the received network packets, the network packet having a first destination address associated with a first network node;
    encapsulating the network packet yielding an encapsulated network packet with an encapsulation header which includes a second destination address different from the first destination address;
    feedbacking the encapsulated network packet into a processing pipeline of the received network packets within the network device at a point in the processing pipeline that is prior to egress port assignment; and
    forwarding the encapsulated network packet to a packet analyzer based on at least the second destination address in the encapsulation header,
    wherein said forwarding the encapsulated network packet comprises transferring the encapsulated network packet, responsively to reading at least the second destination address in the encapsulation header, to an agent which is in communication with the packet analyzer, and
    wherein the agent is configured to add another layer of encapsulation with metadata, prior to forwarding the encapsulated network packet to the packet analyzer.

10. The method according to claim 9, wherein the encapsulating is performed after the network packet has been assigned to one of the egress ports assigned for forwarding traffic to the first network node.

11. The method according to claim 9, wherein the encapsulating is performed after at least some data of the network packet has been read from a memory to one of the egress ports assigned for forwarding traffic to the first network node.

12. The method according to claim 9, further comprising making a decision to drain one of the queues comprising multiple ones of the network packets resulting in dropping the multiple network packets including the network packet.

13. The method according to claim 9, wherein the packet analyzer is disposed externally to the network device, the method further comprising: assigning the encapsulated network packet to one of the egress ports; and forwarding the encapsulated network packet to the packet analyzer via the network.

14. The method according to claim 9, wherein the packet analyzer is disposed externally to the network device, the method further comprising: assigning the encapsulated network packet to one of the egress ports; and forwarding the encapsulated network packet to the packet analyzer, which is directly connected to the network device.

15. The method according to claim 9, further comprising including metadata in the encapsulation header of the encapsulated network packet.

16. The method according to claim 15, wherein the metadata includes one or more of the following: an ingress port identification; an ingress priority; an ingress timestamp; an egress timestamp; a pad count of padding of the network packet; a packet switch network identification; an identification of an egress port of the first destination address; whether the network packet is a unicast or multicast packet; an egress queue; an ingress buffer fill level; an egress buffer fill level; flags;

a mirror reason; and a mirror agent identification.

* * * * *